(12) United States Patent
Nickell et al.

(10) Patent No.: US 7,810,068 B2
(45) Date of Patent: Oct. 5, 2010

(54) PASTE BY EXAMPLE

(75) Inventors: Seth Nickell, Cambridge, MA (US); Bryan Clark, Cambridge, MA (US)

(73) Assignee: Red Hat, Inc., Raleigh, NC (US)

( * ) Notice: Subject to any disclaimer, the term of this patent is extended or adjusted under 35 U.S.C. 154(b) by 1325 days.

(21) Appl. No.: 11/163,413

(22) Filed: Oct. 18, 2005

(65) Prior Publication Data

US 2007/0089098 A1    Apr. 19, 2007

(51) Int. Cl.
*G06F 9/44* (2006.01)
(52) U.S. Cl. .................. 717/109; 717/105; 717/108
(58) Field of Classification Search .............. 717/109, 717/105, 108
See application file for complete search history.

(56) References Cited

U.S. PATENT DOCUMENTS

| | | | |
|---|---|---|---|
| 4,941,829 A | | 7/1990 | Estes et al. |
| 5,280,275 A | | 1/1994 | Kaplan |
| 5,862,379 A | * | 1/1999 | Rubin et al. ............... 717/109 |
| 5,878,425 A | * | 3/1999 | Redpath ..................... 707/102 |
| 5,911,070 A | * | 6/1999 | Solton et al. ............... 717/105 |
| 5,956,711 A | * | 9/1999 | Sullivan et al. ............... 707/6 |
| 6,029,158 A | | 2/2000 | Bertrand et al. |
| 6,029,159 A | | 2/2000 | Zorba et al. |
| 6,064,812 A | * | 5/2000 | Parthasarathy et al. ...... 717/105 |
| 6,064,816 A | * | 5/2000 | Parthasarathy et al. ...... 717/109 |
| 6,199,195 B1 | * | 3/2001 | Goodwin et al. ............ 717/108 |
| 6,493,690 B2 | | 12/2002 | Bertrand et al. |
| 6,658,398 B1 | | 12/2003 | Bertrand et al. |
| 2002/0035478 A1 | | 3/2002 | Levitt et al. |
| 2003/0113699 A1 | | 6/2003 | Johnson et al. |
| 2003/0163361 A1 | | 8/2003 | Burgess et al. |

OTHER PUBLICATIONS

Malloy, et al. "Exploiting UML dynamic object modeling for the visualization of C++ programs", 2005, ACM, p. 105-114.*

* cited by examiner

*Primary Examiner*—Wei Y Zhen
*Assistant Examiner*—Qamrun Nahar
(74) *Attorney, Agent, or Firm*—MH2 Technology Law Group LLP (57) ABSTRACT

Dynamic tutorial generation for user help and user guidance in generating a property of an exemplar object is provided. The user identifies the exemplar object, the object or one of its properties is analyzed, user operations for producing the property of the object are determined, and the determined user operations are presented. Path finding logic may be used to identify a sequence of states using transform operations to reach a goal state with the desired property of the object. Transformation operations may be applied and the resulting states may each be compared to the goal state using a heuristic that yields a similarity metric between each of the resulting states and the goal state.

24 Claims, 11 Drawing Sheets

PASTE BY EXAMPLE

FIELD OF THE INVENTION

The present invention relates generally to computer technology, and particularly to user guidance and user help, and to the field of dynamic generation of a user tutorial for creating attributes of a selected object.

BACKGROUND OF THE INVENTION

With the proliferation of different types of software, users are increasingly confronted with the need to learn or to navigate unfamiliar software applications. In addition, software has grown more powerful, empowering users to create an ever-greater variety of documents, files and products using software. As a result, software has grown in complexity making it more difficult to master all of the features of software application by any one user. The need for automated user guidance in using software has thus increased.

Printed material to assist users in using software applications, such as how-to books, user manuals and printed works designed to train the user for one or more related set of tasks using a particular software application are well-known. However, these printed materials may pose several problems. First, they may be difficult to find and obtain, and may require additional space for storage. Also, they may entail additional cost. Second, they may never be comprehensive, or completely up-to-date. Third, they require that the user navigate the index/table of contents, and to name the feature sought as it is listed in the index/table of contents. The user may have a very good idea of what he or she is trying to achieve using the software, but not know the name given to the features by the writers of the printed material. Further, the user may have to find several features in the printed material in order to accomplish one task or to generate one object involving more than one feature.

User help features also exist to guide the user. However, as with printed material, these help features typically rely on an index of tasks that the user must use to find the desired information. The index of tasks may not be comprehensive and the user may not know the names all of the features sought. Suppose for example the user wishes to create an interesting graphic that she/he has seen implemented in this software application, but does not know the names given by the writers of the help menu of each of the features that comprise the interesting graphic. The user may not even know how many features were used or could be used in generating the graphic. Such a user would have to guess at the various possible names of each of the features that make up the graphic, and look up these features individually in the user help index or help menu. The same would apply to on-line indexes and help menus.

Dynamic tutorials, including on-line tutorials have been created to assist users. However, some rely on previously stored sequences of user inputs. Many objects are made up of a combination of different features; thus several different such sequences would be necessary to guide the user in generating an object with all of the features, even if recorded guidance were available for all of the features. Further, such an application would be impractical for providing comprehensive guidance with respect to more recently released software applications that have many more features and subtleties.

SUMMARY OF THE INVENTION

A dynamic tutorial generation for user guidance in generating a property of an exemplar object is provided. The user identifies the exemplar object, the object or one of its properties is analyzed, user operations for producing the property of the object are determined, and the determined user operation is presented. Path finding logic may be used to identify a sequence of states that includes a goal state that includes the property of the object.

According to an aspect of the invention, the user operation may be determined by applying a set of transformation operations to a first state to arrive at a plurality of second states, judging as a best second state a second state of the plurality of second states whose properties overlap most with a goal state that includes the at least one property of the object, applying a further transformation operation to the best second state, and identifying the at least one user operation based on the transformation operations applied.

Also, the user operation may be determined by applying a set of transformation operations to a first state to generate a plurality of second states; judging as a best second state a second state of the plurality of second states most similar to a goal state that includes the at least one property of the object, based on a percentage of properties in common; applying a second set of transformation operations to the best second state; and identifying the at least one user operation based on the transformation operations applied.

The user operation may be also be determined by applying a set of transformation operations to a first state with a first set of properties to generate a plurality of second states;

judging as a best second state a second state of the plurality of second states most similar to a goal state that includes the at least one property of the object, based on a percentage of properties in common; eliminating all second states of the plurality of second states except the best second state; and applying a further set of transformation operations to the best second state to generate a plurality of third states. Also, some or all of the transform operations that generated second states other than the best second state may be applied to the best second state.

The user is further enabled to identify the at least one property of the object.

Also, additional properties of the object may also be processed. For example, a second property of the identified object can be analyzed, a second user operation for producing the second property of the object may also be presented. Similarly, all of the determined properties of the identified object may be analyzed, and user operations for producing all the analyzed properties of the identified object may be presented to the user.

Identifying the object comprises may be accomplished, for example, by selecting the object as the content of a paste buffer, or by selecting a pointer to the object.

The user operation may be provided as a visual presentation to the user, for example as a menu control sequence. The menu control sequence may include animation or one or more animation clips. Also, an audio signal may be output to the user to instruct about the user steps required to generate an object like the exemplar object or one or more of its features.

Also, the user may be allowed to select a step of the user operations presented and one or more sub-steps for the selected step may then be provided.

A processor-readable medium and system to implement the method outlined herein are also contemplated.

DETAILED DESCRIPTION OF THE INVENTION

The following discussion and the foregoing figures describe embodiments of Applicant's invention as best understood presently by the inventors, however, it will be appreciated that numerous modifications of the invention are possible and that the invention may be embodied in other forms and practiced in other ways without departing from the spirit of the invention. Further, features of embodiments described may be omitted, combined selectively or as a whole with other embodiments, or used to replace features of other embodiments, or parts thereof, without departing from the spirit of the invention. The figures and the detailed description are therefore to be considered as an illustrative explanation of aspects of the invention, but should not be construed to limit the scope of the invention.

Figure 4:
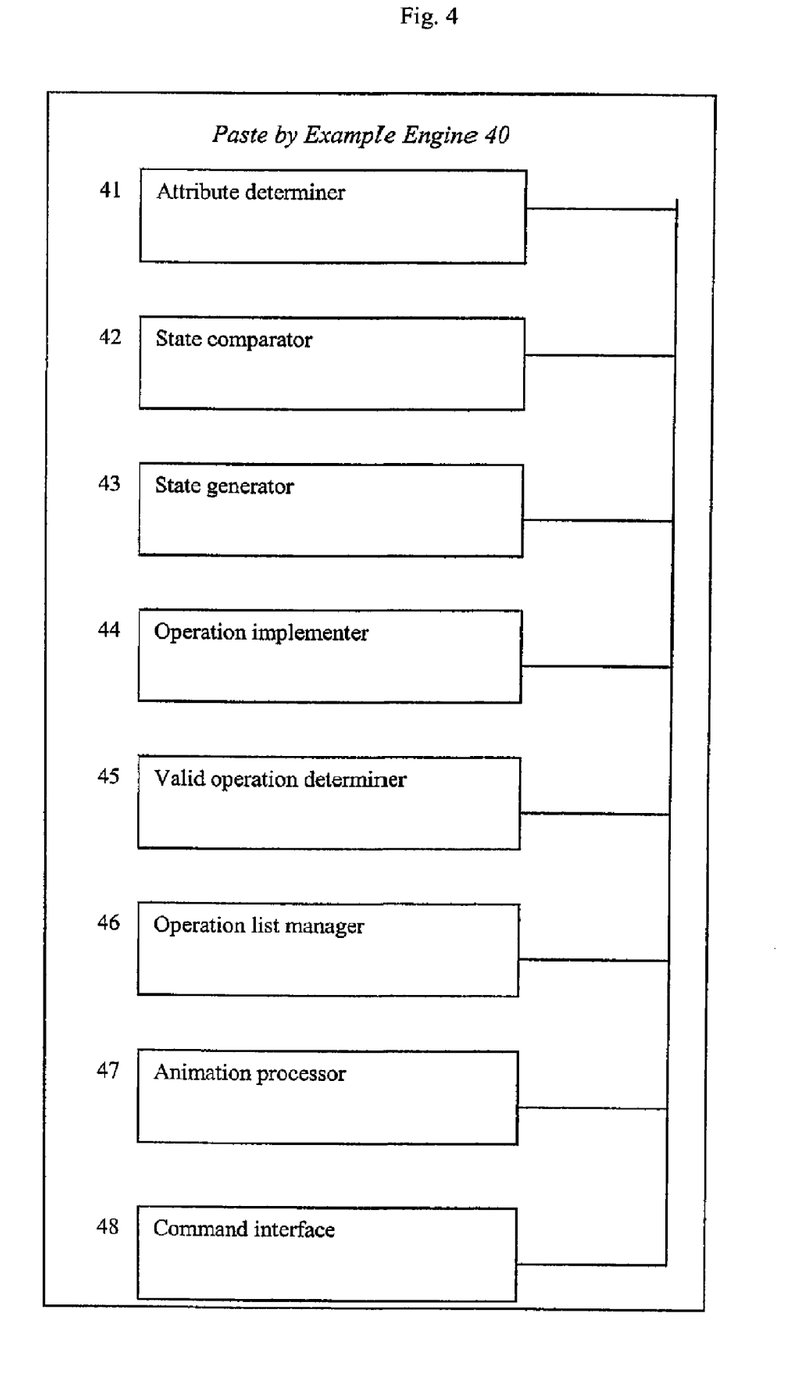
FIG. 4 is a schematic illustrating a paste by example engine according to an aspect of the present invention.

As shown in FIG. 4, a paste by example engine 40, according to the present invention may include several modules, which will be described below. Modules of such a system, or portions thereof, may be comprised of hardware, software, firmware, or a combination of the foregoing, however some modules may be comprised of hardware for example, while other modules may be comprised of software, firmware or a combination thereof.

FIG. 4 illustrates a paste by example engine 40 according to an aspect of the present invention. The paste by example engine 40 may be a module of a software application, such as a word processing application, a spreadsheet application, a CAD application, a slide show or presentation application, a desktop publishing application, a drawing or graphics generation application, a picture or photo editing or processing application, a video or audio file editing or processing application, or the like. Also, the paste by example engine 40 may be a stand-alone software package, or a module associated with an operating system, which could handle objects generated using one or more types of software applications, for example of the types above-listed.

The attribute determiner module 41 of the paste by example engine 40 analyzes the properties of an object identified by a user and state generator 43 creates a Goal state with a set of properties corresponding to the properties determined for the identified object.

Operation implementer 44 applies a transform operation to one or more properties of a set of properties associated with a state. Typically, such a transform operation yields a second state with a different set of properties from the property set of the first state. The operation determiner 45 determines a subset of transform operations of the complete set of transform operations available that are applicable for or may be performed on a set of properties associated with a particular state.

Operation list manager 46 maintains a list of "productive" operations that have been performed. Animation processor 47 provides an animation to a user interface or a display based on the list of operations maintained by operation list manager 46. Command interface 48 handles commands received from outside of the paste by example engine 40, including commands from the user. State comparator 42 compares a set of properties of a state with the set of properties associated with the goal state, and yields a metric of their similitude. State comparator 42 may also compare such metrics. Other functions and aspects of the foregoing modules of the paste by example engine 40 will become apparent from the discussion below.

Operations of embodiments of the present invention will now be explained with reference to FIGS. 1-4. It will be understood that this discussion of an operation of a system according to the present invention is provided merely as an example to illustrate aspects of the present invention.

Figure 1:
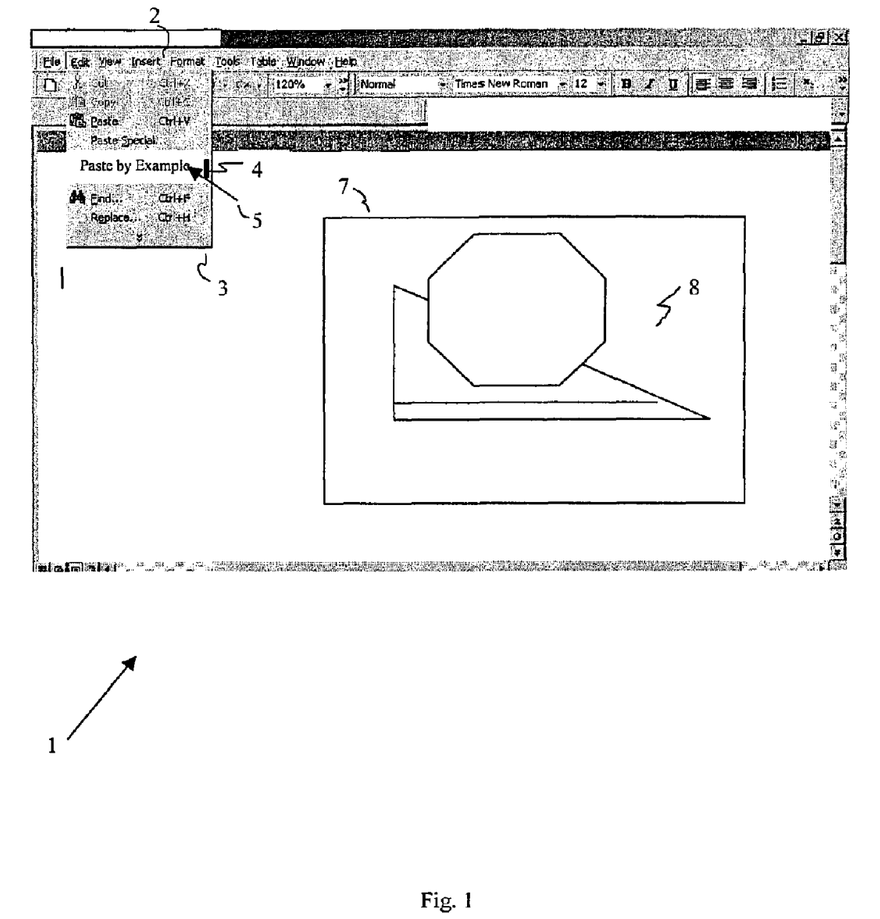
FIG. 1 is an illustration of an object being selected by the user as an exemplar object according to an aspect of the present invention.
Figure 3A:
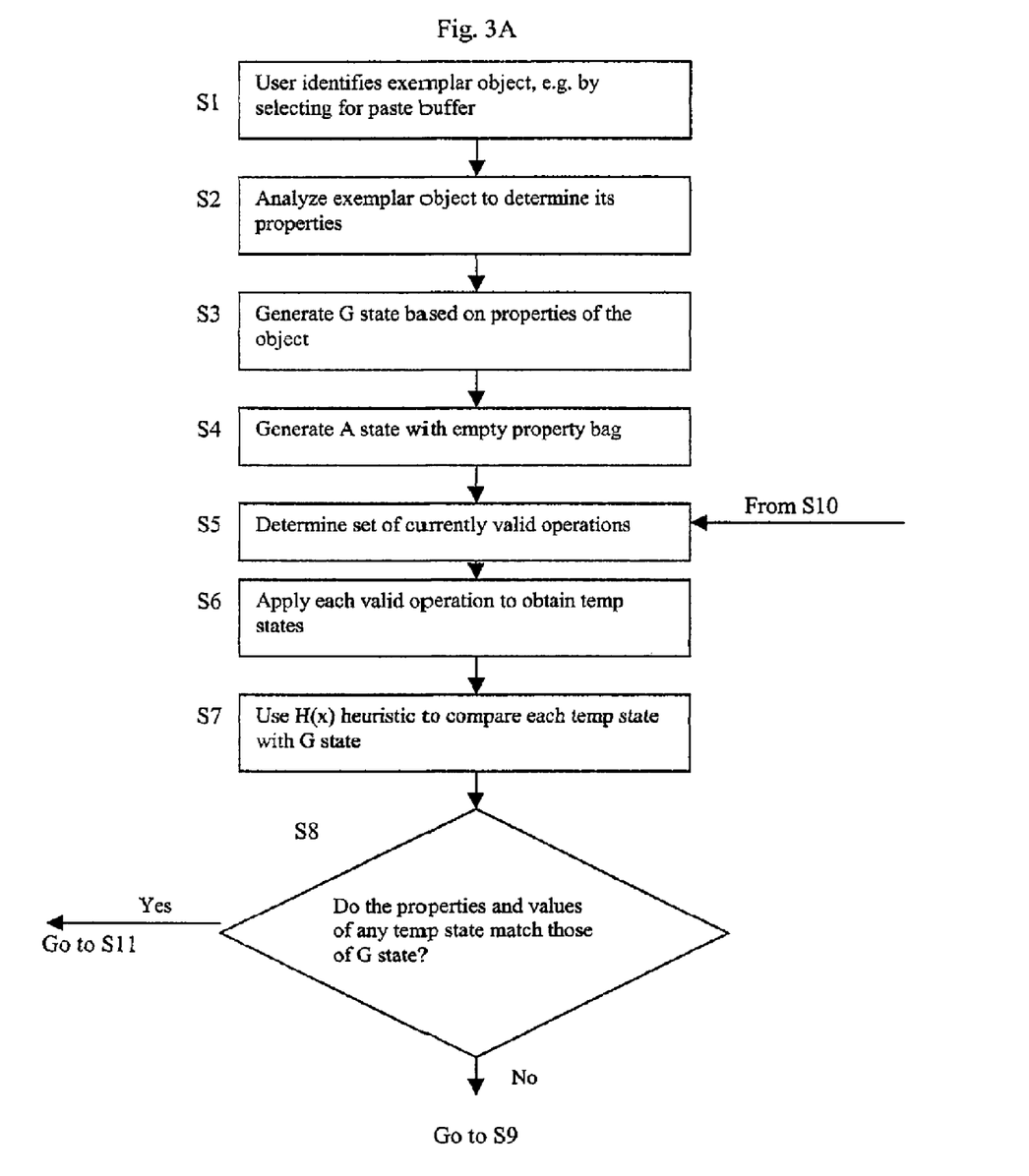
FIGS. 3A and 3B are a flowchart illustrating operations performed according to a an aspect of the present invention.

A user (not shown) sees an interesting object 8 on a display or interface associated with a computer resource that the user wishes to learn to generate using a particular software application. Such an object may be a graphical object, a drawing, a chart, a table, a graph, a picture, an icon, a figure, animation, a video or audio file or clip, a design, such as a design generated with a CAD application, or the like. The user selects the object 8 to be the exemplar object by, for example, highlighting the object 8. FIG. 1 shows the object 8 inside a paste buffer 7. For example, the user may select the object 8 by cutting or copying the object 8 to a clipboard or paste buffer 7 of GUI 1 of the software application (shown in this example as a word processor) and then selecting a paste by example feature 5 using a drop-down menu 3 of the toolbar 2. This is shown in FIG. 3A as S1, the user identifies an exemplar object. The exemplar object is shown as an octagon partially obscuring a triangle with an extra line.

The display used by the user to interact with the paste by example engine 40 may comprise an area on a monitor or display, such as a CRT screen, a flat screen display (e.g. LCD or plasma), a projection system, or any such display system suitable for carrying out the present invention. For example, if the user wishes to learn to duplicate an object generated in a word processing application, the user may open the word processing application, click on, highlight, or otherwise select the object, and select paste by example, by for example using a menu or drop-down menu. The user may do this on a variety of displays or devices, such as on a display space associated with a desktop personal computer, a laptop or notebook personal computer, handheld device, PDA, wireless or mobile communication device or the like, or on a display space logically connected to the computer resource in which the software application in which the object is generated is running. Such a logical connection may include a wired or wireless connection, including a connection via a network, such as a LAN, a WAN, or the Internet.

At S2 of FIG. 3A, the exemplar object is analyzed to determine its properties by attribute determiner 41 of the paste by example engine 40 of FIG. 4. A property bag feature may be used to obtain a set of properties and values that comprise the exemplar object. In some applications, an API may be used to request a list of the properties of an object (the property bag), and retrieve and change values of specific properties. Also, a hash table may contain entries corresponding to properties of the object, which may be retrieved using a key-value pair approach. In this way, at S3 a Goal state (G state) with a set of properties corresponding to the exemplar object is created by state generator 43.

Also, according to an aspect of the present invention, the user may indicate one or more features of the exemplar object that the user is interested in learning to create, and the paste by example engine 40 could just focus on those aspects or features. According to an aspect of the invention, the user may be prompted with a list of features identified for the exemplar object, for example by retrieving the properties of the exemplar object from a property bag associated with the exemplar object. For example, the user may just be interested in learning how to generate a triangle, or features thereof, that is/are part of the exemplar object, and may select the features for which the paste by example functionality is desired from the paste by example engine 40. Accordingly, paste by example engine 40 would ignore all non-selected properties and set as the G state (Goal state) only the set of properties identified.

At S4, an A state (initial state) is generated by state generator 43. A state has an empty property bag. Accordingly, in generating A state no data concerning the G state may be required. Alternatively, the system may assume that certain properties of the exemplar object are present, or may rule out the presence of certain properties, based on information available from the object, or based on the type of software application that is currently being used by the user.

At S5, valid operation determiner 45 determines a set of transform operations that may be validly performed on the present state (A state). According to an aspect of the present invention, a master list of transform operations is maintained, and valid operation determiner 45, at S5 determines the set of transform operations that may be properly applied to the set of attributes associated with the present state. Such a master list may vary from software application to software application, or a subset of the list of transform operations may be determined for a given application based on information about the types of objects commonly generated in the application. An example of a subset of valid transform operations is provided below.

At S6, operation implementer 44 applies each of the transform operations from the set of valid operations determined by valid operation determiner 45. In this way, temporary ("temp") states 1, 2, 3 ... N (N being a positive integer equal to the number of currently valid operations) are determined, each temp state having a property set identical to A state except for the transformed property for that temp state. Also, values associated with each property or with the object generally may be transformed a number of times using transform operations to obtain a temp state with the best similarity metric. Accordingly, values associated with a property subject to the transform operation would be processed several times to generate several sub-temp states, until the value with the best heuristic H(x) result for that temp state is found. Thus, for values such as an x coordinate, the temp state for any iteration may be the state with the value closest to the G state.

At S7, the property set of each of the temp states 1, 2, 3 ... N is compared in turn with the property set of the Goal state by state comparator 42. For example, state comparator 42 may generate a metric, such as a percentage representing the overlap between the property set of temp state 1 and the property set of the Goal state, which represents the similarity between current state and the Goal state. The heuristic H(x) shown at S7 yields such a metric. It will be understood that besides a percentage representing the overlap, other types of metrics may be used, for example, a ranking based on overlap may be assigned, or a number of features that do not match may be counted.

At S8, state comparator 42 decides whether the properties and values of any of the temp states match the properties and values of the goal state. For example using the heuristic H(x) discussed above, if the overlap between the property set of a temp state and the property set of the Goal state is 100 percent, then a match has been achieved and as indicated by the "Yes" branch, operation proceeds to S11 of FIG. 3B. Alternatively, if the properties and values of none of the temp states match those of the Goal state, then as indicated by the "No" branch, processing proceeds to S9.

At S9, state comparator 42 determines the temp state that compares most favorably with the G state. For example, using the heuristic H(x) it is determined which temp state has an overlap percentage with the Goal state that is highest. In other words, of the previously applied transform operations, the most "productive" operation is kept. As shown at S10, the performed operation of the best temp state is added to the list of performed operations. The "non-productive" or relatively "less productive" transform operations of the remaining temp states are not to be added to the list of operations performed and the remaining temp states are eliminated. Alternatively, all remaining "productive" operations, all temp states that have a higher overlap with G state than the overlap of the current state with G state, may now be added to the list of performed operations, and the next current state upon resuming at S5 may thus be the result of all such remaining "productive" transform operations, in addition to the "most productive" transform operation (associated with the best temp state) determined. In such a case, a test such as the test shown at S8 may have to be performed after such an "amalgam" current state is determined, so as not to miss the achievement of G state by a combination of all "productive" operations applied, before application of the next set of transform operations.

At this point, processing returns to S5 of FIG. 3A, where a set of operations valid for the property set of the current state is determined by valid operation determiner 45. From this point forward this state is referred to in FIGS. 3A-B as the current state. As shown at S6, each valid transform operation is applied to generate a new set of temp states.

Figure 3B:
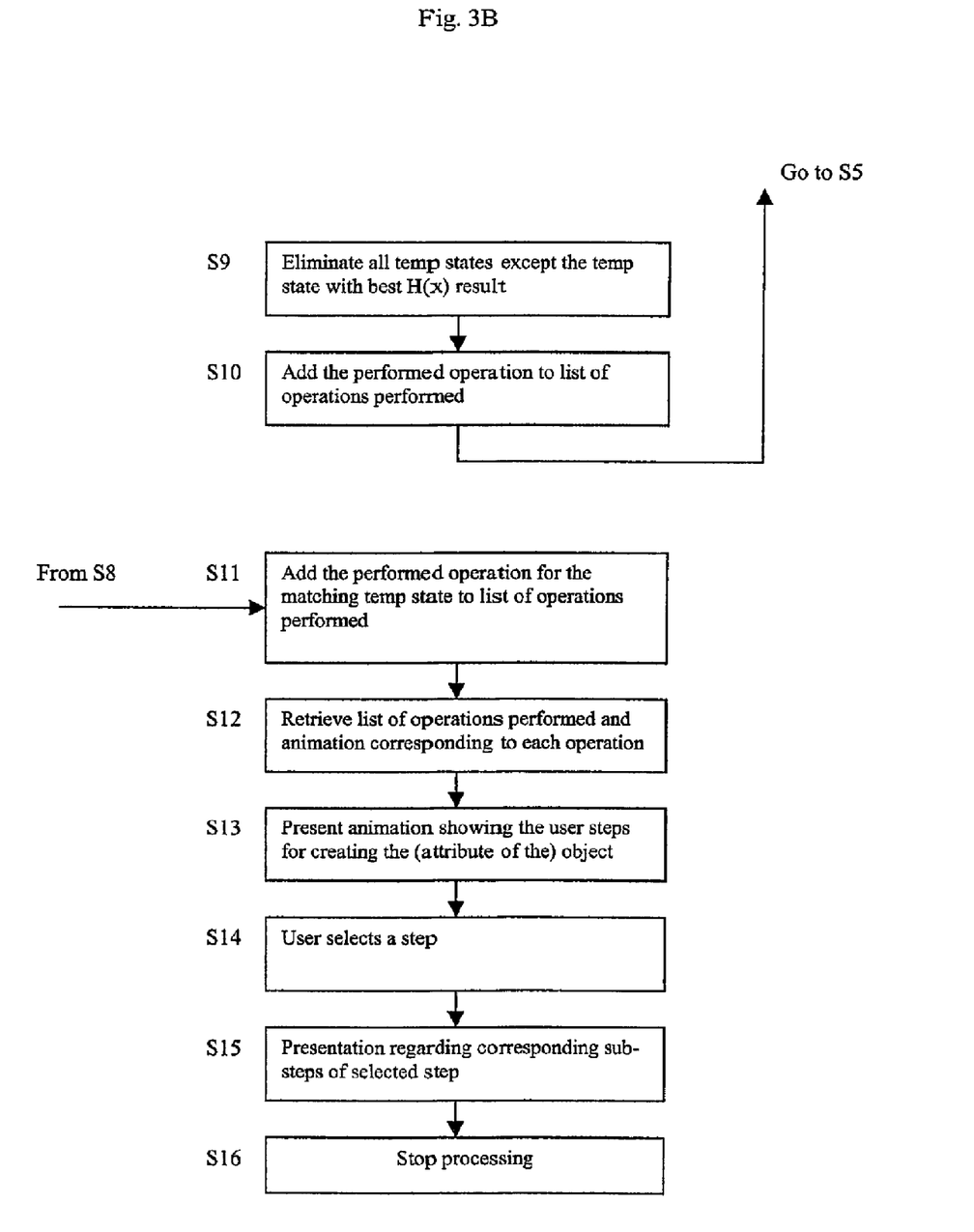

As discussed above, when at S8 it is determined according to heuristic H(x) that the properties and values of the current state match the properties and values of the Goal state, as shown by the branch "Yes", processing proceeds to S11. At S11, the list of operations performed is processed by operation list manager 46 to determine the user steps to be shown to the user. According to an aspect of the present invention, each transform operation is associated with a user step, such as animation showing menu control and/or cursor movement that the user may perform to generate the associated feature. For example, a transform operation that sets shading for a line of a triangle that has been stored on the list of operations performed is associated with a step to be performed by the user to generate the shading of the line. Similarly, the user step may be shown to the user using a stored animation clip that is associated with the transform operation.

At S12, the user is presented with the user steps corresponding to the list of performed operations. For example, a series of animation clips may be presented to the user by animation processor 47, each clip being associated with a transform operation from the list of operations performed. It will be understood however that the user steps necessary to generate the features of the object may be shown to the user in a variety of ways and by using a variety of formats besides animation.

Figure 2:
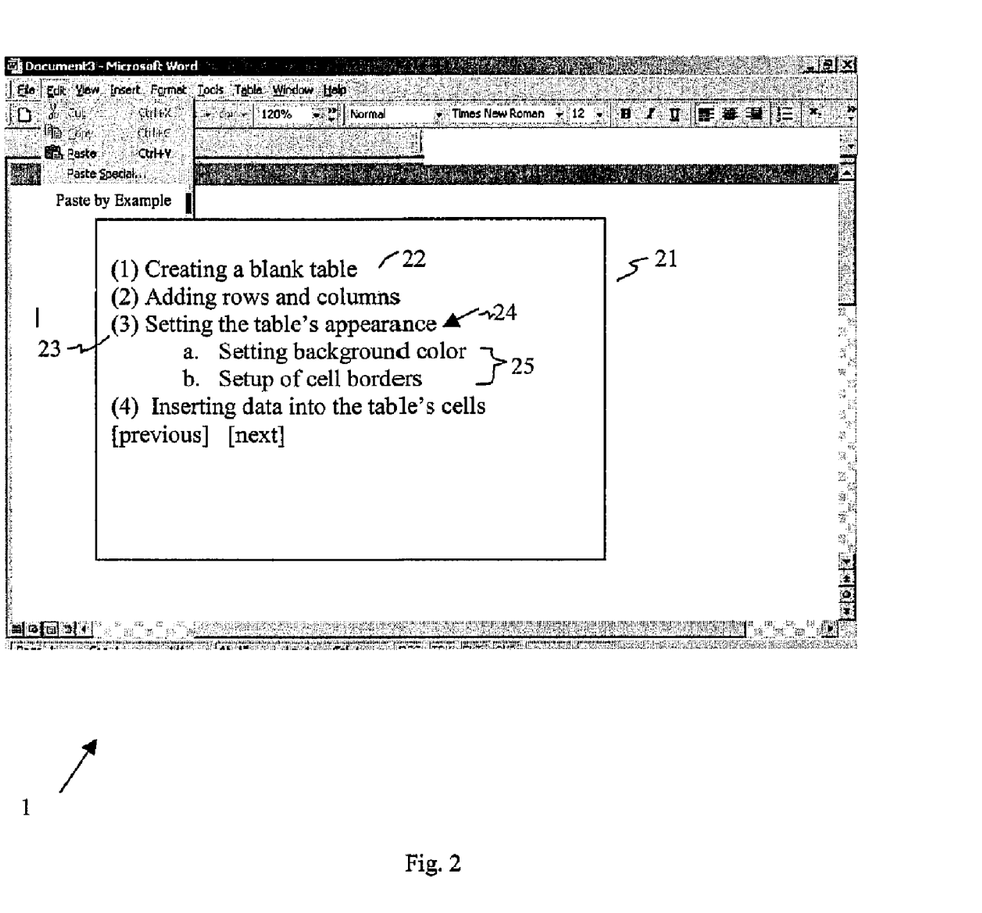
FIG. 2 is an illustration of sub-steps of a selected user step being shown to a user according to an aspect of the present invention.

For example, as shown in FIG. 2 a list of user steps 22 may be presented on a display using a dialog box 21 of a GUI 1 of the software application. In the example shown in FIG. 2, the exemplar object is a table with rows and columns, and the user steps are for creating various features of such a table. Other ways of presenting the user steps for generating the exemplar object may include providing one or more video clips to the user, providing audio instruction, a combination of the foregoing types of presentation, and other such modes of presentation to the user.

Also, the user steps may be presented in an order to facilitate understanding by the user, and not necessarily in the order in which the transform operations were performed. For example, as shown in FIG. 2, when the exemplar object is a table with rows and columns, with each cell of the table having certain properties, the user could be first shown user steps for creating the blank table and then user steps for adding rows and columns, before the user steps for generating the particular properties of the cells and cell boarders are presented, irrespective of the order in which the transform operations were performed by the paste by example engine 40. Similarly, user steps for generating the basic types of figures comprising the object could be presented to the user before the user steps for moving the figures to appropriate locations with respect to the overall object or the display space.

According to an aspect of the present invention, the paste by example engine 40 may also allow the user to request more information about one or more of the user steps presented, as shown at S13. For example, as shown in FIG. 2, the user may select a user step 23, and in response sub-steps 25 of the selected user step 23 may be provided to the user, as described at S14. In the example shown in FIG. 2, the user selects user step 23, "Setting the table's appearance" by moving a cursor 24 to the user step 23 and clicking on, highlighting or otherwise selecting the user step 23. Command interface 48 of the paste by example engine 40 receives and processes the user command requesting additional guidance for user step 23.

According to a further aspect of the present invention, one or more of the sub-steps 25 may be further broken down into further sub-steps (sub-sub-steps, not shown) upon selection of a sub-step by the user, and further information or guidance may be provided for the further sub-steps of the sub-step. When the exemplar object is a complex one, user steps for generating the exemplar object may be presented to the user as shown in FIG. 2, and upon user selection of a user step 23, an animation, video or other more detailed or elaborate presentation may be made to the user to illustrate generation of the selected user step 23. In this way, the presentation of detailed information about user steps familiar to the user may be avoided.

At S15, processing is stopped after the presentation of the user steps.

An example of an operation of the paste by example engine 40 using a simple square exemplar object will now be given including pseudocode to illustrate the processed according to the invention. It will be understood however that the pseudocode examples are provided merely to illustrate aspects of the present invention, and many other types of implementations are possible.

The exemplar object is identified by the user at S1. At S2, the exemplar object is analyzed and its properties determined to be as follows: a square of size 5(units are irrelevant for this example) positioned on the display at the coordinates x=10, y=15 (units are irrelevant for this example).

G State (Goal state) is generated at S3, having one object O with the property bag:

"object_type"=square

"x"=10, "y"=15

"size"=5

At S4, A State (initial state) is generated with an object O with an empty property bag. For purposes of illustration, the following list of transform operations are available on a list of available transform operations:

move_object (takes object, modifies x and y values)

resize_square (takes object with object_type=square, modifies size values)

change_object_type (takes object, modifies object_type property)

Using the heuristic, H(x)=percentage of properties in state x that match a property in G state, for each state, the following algorithm is executed:

```
define get_next_operation(current_state):
    operation_list = get_valid_operations_from_current_state( )
    for each operation in operation_list do:
        new_state = apply_operation(operation, current_state)
        new_state_list.append_to_list(new_state)
    best_state = get_state_with_best_heuristic(new_state_list)
    return best_state
```

At S5, the valid operations—the transform operations that may be performed given the property set of A state—are now determined. The operation move_square cannot be performed since the preconditions for it (namely object_type=square) are not met. From the list of available transform operations, the set of currently valid operations are determined as {move_object, change_object_type}.

The transform operation move_object is performed, and a state designated temp state 1 is created. This yields a 50% properties match, since the x coordinate and the y coordinate are matched. It will be understood that a transform operation involving a value such as a value for the coordinate x may entail the generation of many values using random or pseudorandom value generation before the x value matching the G state x value is found for the temp state. Also, data from the G state may be available, depending on the way in which the data about the exemplar object is represented in the software application, to arrive at the x value of the temp state in a more direct way.

A transform operation change_object_type yields only a 25% match; a state with such a property is designated temp state 2.

At S8, it is determined that neither temp state 1 nor temp state 2 matches G state exactly. Therefore, at S9, the move_object operation is added to the list of performed operations, and processing returns to S5 and B state is generated (and will be referred to as the current state in FIGS. 3A, B, from this point forward).

B state corresponds to an object with property bag:
"x"=10, "y"=15

For B state the currently valid operations are determined as move_object and change_object_type. Both of these are attempted yielding temp state 1 and temp state 2. According to the heuristic H(x), relative to goal state G move_object still yields no more than a 50% match of properties (since moving it to exactly the same place does not advance the process—50% has already been achieved). The operation change_object_type yields a 75% match, and thus at S9 the other temp state with the non-productive transform operation is eliminated, and at S10, the change_object_type is added to the list of performed operations. Processing returns to S5. The current state in FIGS. 3A and 3B now refers to a new C state.

C State has a property bag:
"object_type"=square
"x"=10, "y"=15

At S5, the currently valid operations are determined for C state. The operations are move_object, or change_object_type, or resize_square (which is now allowed because the precondition for resize_square is met, namely object_type=square). Each of these transform operations is tried to see which gets closer according to the heuristic H(x) to goal state G.

The operations move_object and change_object_type each yield states with heuristic value at 75%, However, the resize_square operation yields a 100% match with G state, and thus at S8, following the "Yes" branch, the process moves to S11, where the operation is added to the list of performed operations.

A series of operations (move_object, change_object_type, resize_square) is now known to be a series of transforms that achieve G state. Since each operation also specifies the one or more user steps that correspond to it, the generation of the object can be presented for the user. For example, an animation that links all the operations together and gets to G state (the exemplar object) is displayed to the user.

An example of the use of a drop-down menu-based paste by example operation and display will now be provided with reference to FIGS. 5-8. It will be understood that this exemplary operation is provided as an illustration of an operation of a system according to the present invention, however many other such operations using other types of user interfaces are also contemplated.

Figure 5A:
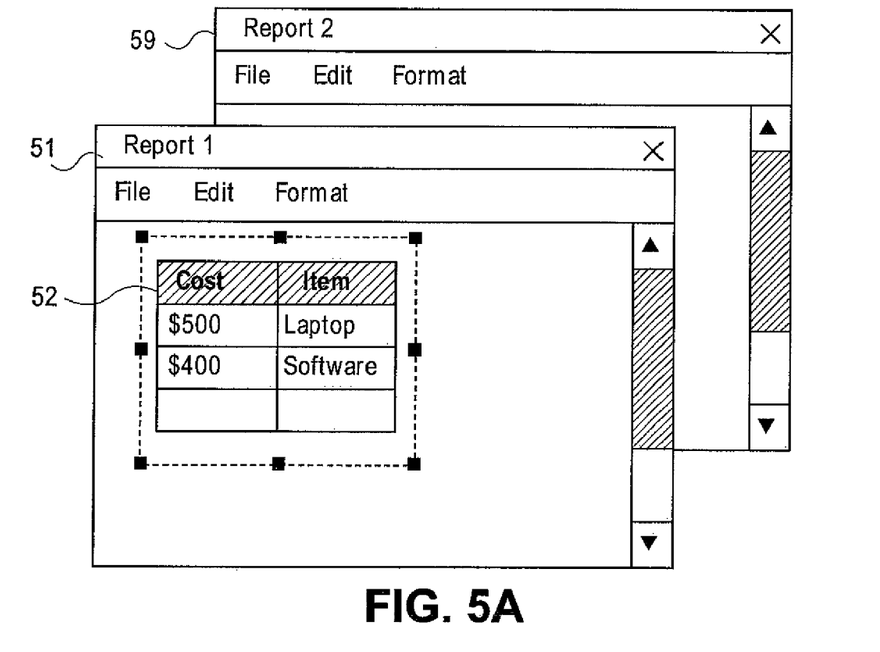
FIGS. 5A-C are schematics illustrating selection of an exemplar object and selection of a paste by example tutorial according to an aspect of the present invention.

FIG. 5A shows two windows of a GUI that are opened by a user (not shown). The first window 51 is entitled "Report 1" and contains a document with a graphical object 52, in this example a table, the properties of which the user wishes to learn to replicate. Also open is a second window 59 that has been entitled "Report 2" into which the selected object will be paste by example by a system according to the present invention.

Figure 5B:
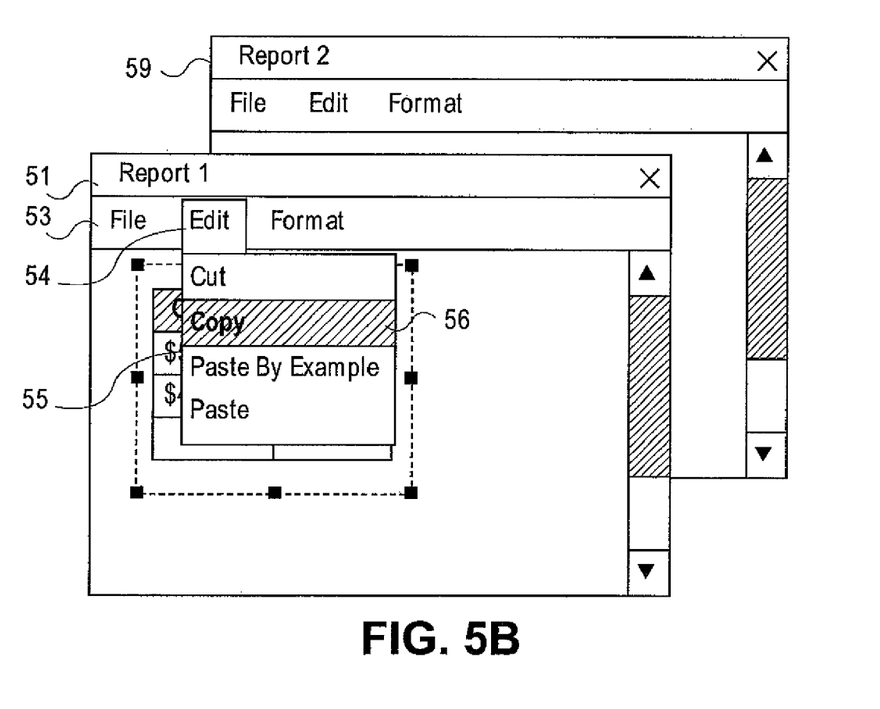

The user selects the table object 52 in first window "Report 1" 51, and as shown in FIG. 5B selects "Edit" 54 from the menu bar 53, which causes display of a drop-down menu 55. The user selects "Copy" 56 from the drop-down menu 55 to thereby capture the table object into the copy/paste buffer. Report 1 contained in first window 51 may now be closed.

Figure 5C:
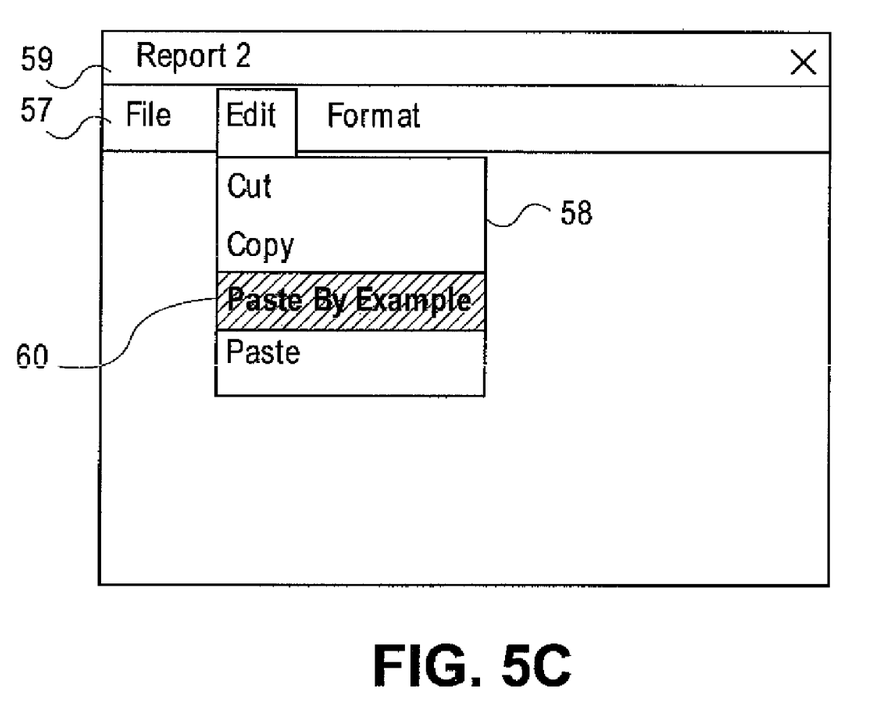

FIG. 5C shows that the user initiates the paste by example tutorial for the table object contained in the copy/paste buffer by selecting "Paste by Example" 60 in the drop-down menu 58 of the tool bar 57 of the Report 2 window 59 into which the user wishes to paste the table object.

Figure 6:
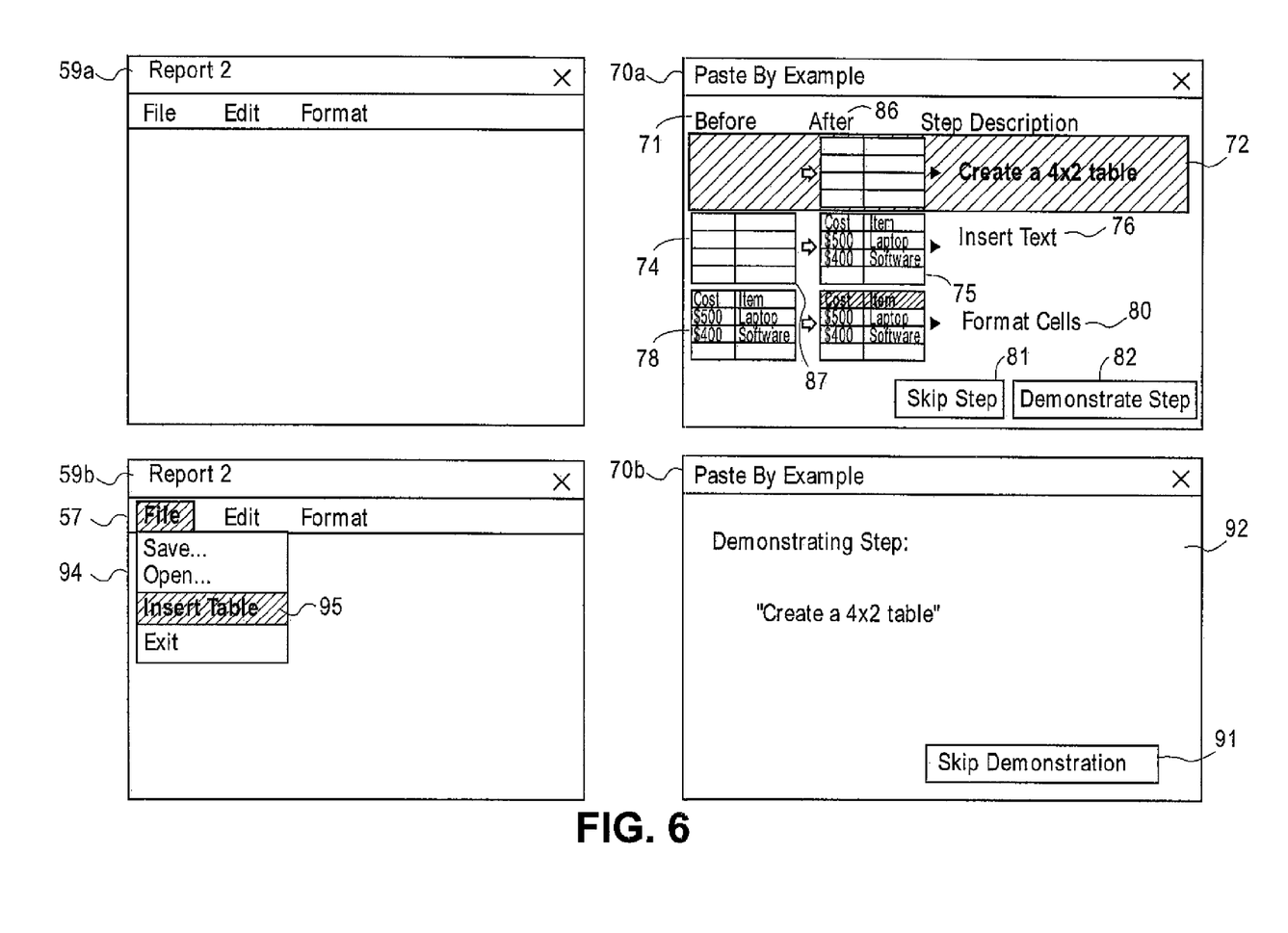
FIG. 6 is a schematic illustrating paste by example status and control windows and target/tutorial windows according to an aspect of the present invention.
Figure 7:
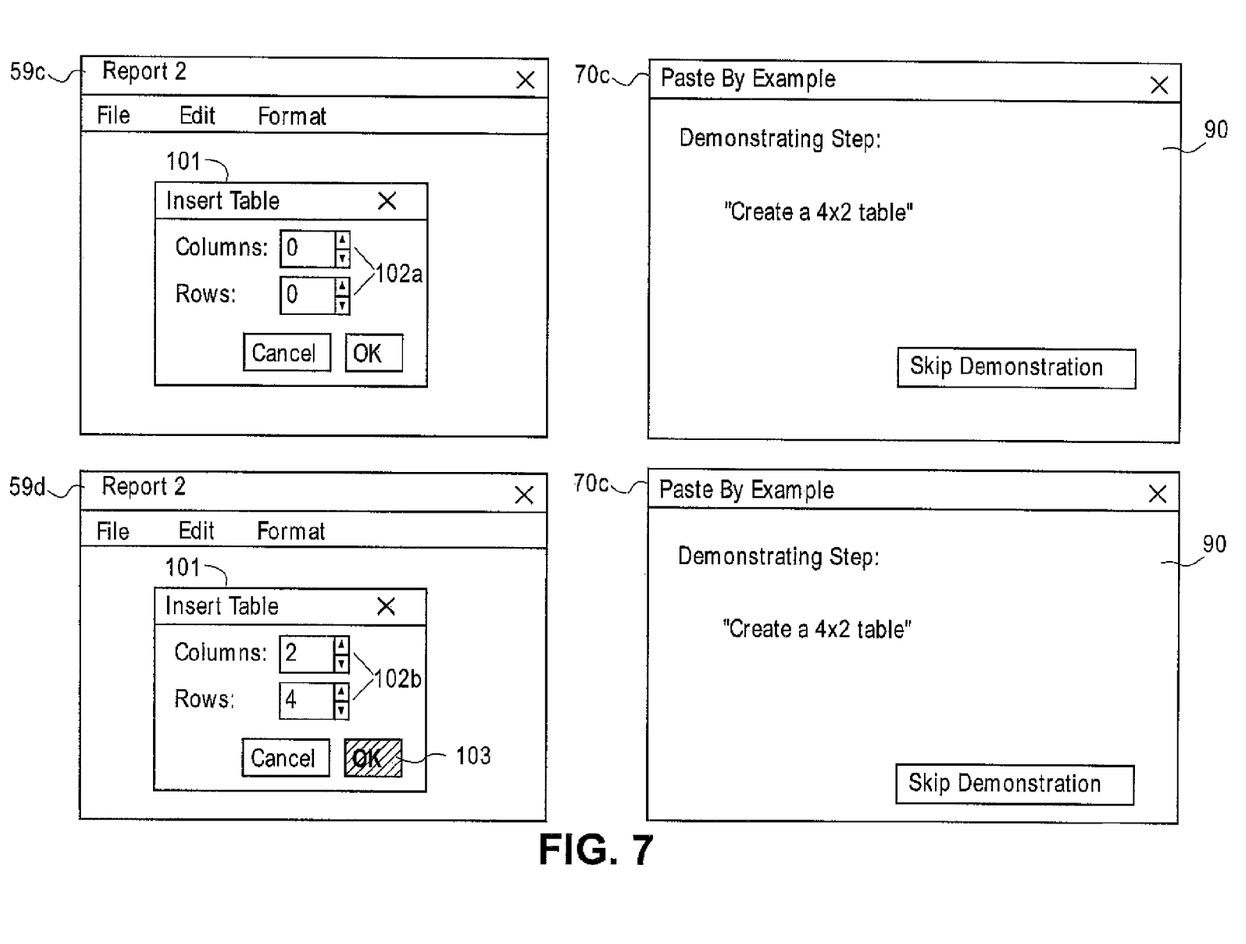
FIG. 7 is a schematic illustrating paste by example status and control windows and target/tutorial windows for the user step of object creation according to an aspect of the present invention.
Figure 8:
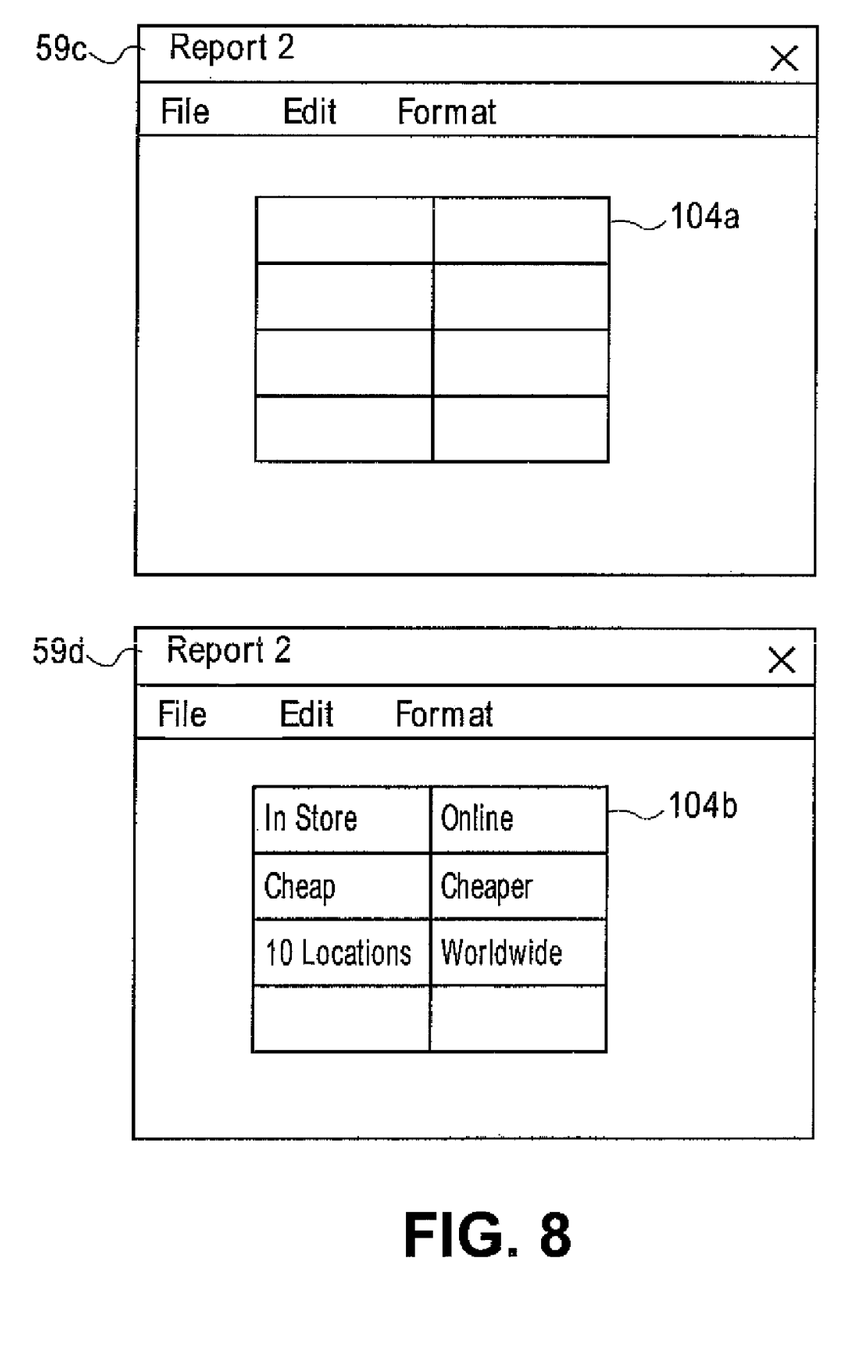
FIG. 8 is a schematic illustrating paste by example status and control windows and target/tutorial windows for the user steps of inserting text and formatting cells according to an aspect of the present invention.

FIG. 6 shows states of two windows arranged in two columns. The Report 2 window 59 being pasted into is on the left column. The paste by example status and control window 70 is on the right. In a typical computer system the paste by example status and control window 70 might be set "on top" (set as active and in the foreground), so it is always visible. FIGS. 6-8 show it in a separate column to reduce occlusion of features in the Report 2 window 59.

FIG. 6 shows that in response to the "Paste by Example" operation initiated in FIG. 5C, the paste by example status and control window 70a appears. It contains three high-level user steps for constructing the table object. Each of these may be expanded by clicking on the right-facing triangles with the accompanying text, if the user wishes to learn about that high-level step. For example, currently, the paste by example status and control window 70a show the "Create a 4×2 table" row 72 as being highlighted showing "Create a 4×2 table" 73 as the state description. The next high-level operation, "Insert Text" user operation 76 is shown as including an icon representing an empty table 74 in the "Before" column 71, and a second icon 75 representing a table with text in the "After" column 86 on the other side of the double arrow 87. The accompanying target window, Report 2 window 59a, of FIG. 6 shows that no object has yet been created.

The user may choose to demonstrate the currently selected step, in this case "Create a 4×2 table" 72, or skip to the next step (in this case "Insert Text" 76). The user chooses the "Demonstrate Step" button 82. The paste by example status and control window 70b shows that a demonstration is being conducted in the Report 2 window 58b, which is now automatically demonstrating the steps to perform the "Create a 4×2 table" operation through an animation. The next set of windows of FIG. 6 shows the paste by example control window 70b displaying that a demonstrating step is in process in the Report 2 window 59b. The Report 2 window 59b shows that the user can create such a table by selecting "File" from the menu bar 57 and then selecting "Insert Table" 95 from the drop-down menu 94.

The user continues to watch the demonstration as shown in FIG. 7. According to an aspect of the present invention, this demonstration may be an animation provided to the user without the need for the user to exert control at this point. FIG. 7 shows the continuation of the tutorial for creating the table object. The paste by example status and control window 70c continues to show that the 'Demonstrating Step: "Create a 4×2 table' is still in progress. Report 2 window 59c shows a dialog box "Insert Table" 101 with columns and rows settings 102a set at 0 and 0, respectively. The second set of windows near the bottom of FIG. 7 shows the paste by example status and control window 70c still displaying that the 'Demonstrating Step: "Create a 4 by 2 table"' is in progress in the accompanying target window, Report 2 window 59c. Report 2 window 59d shows the "Insert Table" dialog box 101 with columns and rows settings 102b now showing values as having been set, and may show clicking the "OK" button 103 to create the table. Control is returned to the user.

With the demonstration for the "Create a 4×2 table" high-level step completed, as shown in FIG. 8 the user may continue by selecting the next high-level step, in this case "Insert Text" 76 of the paste by example status and control window 70e. Alternatively, the user may repeat any demonstration of a step by selecting the step again from the paste by example status and control window. As shown in Report 2 window 59e, the tutorial demonstrates filling in text information into the table object 104a. Control is again returned to the user. The next high-level step, such as "Format Cells" 70f may be highlighted automatically by the system, or the user may highlight it. The user can then select this high-level step using a pointer device, such as a mouse, and clicking or selecting the "Demonstrate Step" button 82. Alternatively, the user can move to a different step by scrolling down or using the "Skip Step" button 81.

As shown in the next pair of windows near the bottom of FIG. 8, the user may chose to expand the "Format Cells" high-level step 80 by clicking on the right facing triangle ("arrow") of that row in the paste by example status and control window 70*f*. Expanding the high-level step lists all the component steps in this composite operation. The user may then click on one of these component steps and get a demonstration of them independently (if, for example, the user only wanted to learn how to format the cell borders). By switching to a different step (skipping the "Insert Text" step), as shown in Report 2 window 59*f*, this window is updated to show what it would look like before conducting the "Format Cells" step. Processing is completed when the user chooses to exit the tutorial, for example, by closing the paste by example status and control window 70*f*, or may terminate automatically when all of the high-level steps have been selected.

The present invention has been described herein with reference to particular exemplary embodiments. These exemplary embodiments are meant to be illustrative, not limiting of the scope of the invention.

What is claimed is:

1. A computer-implemented method of providing user guidance for reproducing a property of a copyable object from content, the method comprising:
   receiving from a user an identification of the copyable object, wherein the copyable object comprises a property;
   generating a goal state comprising a value associated with the property of the identified copyable object;
   generating an initial state comprising the property of the identified copyable object;
   applying a set of transformation operations to the initial state to generate a plurality of temporary states, each of the plurality of temporary states having a temporary value associated with the property;
   comparing the temporary value of each of the plurality of temporary states with the value of the goal state to determine a matching temporary state of the plurality of temporary states that most closely matches the goal state;
   identifying a user operation for reproducing the property of the identified copyable object in a new object based on the transformation operations applied to generate the determined matching temporary state; and
   presenting, to the user, at least one option for creating the new object using the identified user operation.

2. The method of claim 1, wherein said determining the user operation comprises using path finding logic to identify a sequence of states that includes a goal state that includes the property of the identified copyable object.

3. A non-transitory processor-readable medium incorporating a program of instructions for performing a method according to claim 2.

4. A non-transitory processor-readable medium incorporating a program of instructions for performing a method according to claim 1.

5. The method of claim 1, wherein said determining the user operation comprises:
   generating a goal state comprising a value associated with the property of the identified copyable object;
   generating an initial state comprising the property of the identified copyable object;
   applying a set of transformation operations to the initial state to generate a plurality of temporary states, each of the plurality of temporary states having a temporary value associated with the property;
   comparing the temporary value of each of the plurality of temporary states with the value of the goal state to determine a matching temporary state of the plurality of temporary states that most closely matches the goal state;
   applying a second set of transformation operations to the determined matching temporary state; and
   identifying the user operation based on the sets of transformation operations applied.

6. A non-transitory processor-readable medium incorporating a program of instructions for performing a method according to claim 5.

7. The method of claim 1, wherein said determining the user operation comprises:
   generating a goal state comprising a value associated with the property of the identified copyable object;
   generating an initial state comprising the property of the identified copyable object;
   applying a set of transformation operations to the initial state to generate a plurality of temporary states, each of the plurality of temporary states having a temporary value associated with the property;
   comparing the temporary value of each of the plurality of temporary states with the value of the goal state to determine matching temporary state of the plurality of temporary states that most closely matches the goal state;
   eliminating all temporary states of the plurality of temporary states except the determined matching temporary state; and
   applying a further set of transformation operations to the determined matching temporary state to generate a plurality of third states.

8. A non-transitory processor-readable medium incorporating a program of instructions for performing a method according to claim 7.

9. The method of claim 1, further comprising enabling the user to identify the property of the identified copyable object.

10. The method of claim 1, further comprising:
    identifying a second property of the identified copyable object; and
    presenting, to the user, a second user operation for producing the second property in the new object.

11. A non-transitory processor-readable medium incorporating a program of instructions for performing a method according to claim 10.

12. The method of claim 1, comprising:
    identifying all properties of the identified copyable object; and
    presenting, to the user, user operations for producing the new object with all the identified properties of the identified copyable object.

13. The method of claim 1, wherein the identification of the copyable object comprises selecting the copyable object as content of a paste buffer.

14. The method of claim 1, wherein the identification of the copyable object comprises selecting a pointer to the copyable object.

15. The method of claim 1, wherein said presenting, to the user, the at least one option for creating the new object using the determined user operation comprises providing a visual presentation to the user.

16. The method of claim 1, wherein said presenting, to the user, the at least one option for creating the new object using the determined user operation comprises displaying a menu control sequence.

17. The method of claim 1, wherein said presenting, to the user, the at least one option for creating the new object using the determined user operation comprises outputting an audio signal.

18. The method of claim 1, wherein said presenting, to the user, the at least one option for creating the new object using the determined user operation comprises displaying animation showing the user operation.

19. A non-transitory processor-readable medium incorporating a program of instructions for performing a method according to claim 18.

20. The method of claim 1, further comprising:
receiving, from the user, a selection from the determined at least one user operation; and
presenting a plurality of sub-operations based on the user selection.

21. The method of claim 1, further comprising:
identifying all properties of the identified copyable object;
presenting, to the user, user operations for producing the new object with all the identified properties of the identified copyable object;
receiving, from the user, a selection from the presented user operations; and
presenting a plurality of sub-operations based on the selected user operation.

22. A non-transitory processor-readable medium incorporating a program of instructions for performing a method according to claim 21.

23. A non-transitory processor-readable medium incorporating a program of instructions for performing a method according to claim 1.

24. A computer-implemented method of providing user guidance for reproducing a property of a copyable object from content, the method comprising:
receiving from a user an identification of the copyable object, wherein the copyable object comprises a property;
generating a goal state comprising a value associated with the property of the identified copyable object;
generating an initial state comprising the property of the identified copyable object;
applying a set of transformation operations to the initial state to generate a plurality of temporary states, each of the plurality of temporary states having a temporary value associated with the property;
comparing the temporary value of each of the plurality of temporary states with the value of the goal state to determine a matching temporary state of the plurality of temporary states that most closely matches the goal state;
identifying a user operation for reproducing the property of the identified copyable object in a new object based on the transformation operations applied to generate the determined matching temporary state; and
creating the new object using the identified user operation.

* * * * *